United States Patent [19]

Ahrweiler et al.

[11] 4,053,276
[45] Oct. 11, 1977

[54] PRESS FOR EXERTING A PRESSURE OVER AN AREA

[75] Inventors: Karl-Heinz Ahrweiler; Kurt Quoos; Eduard Küsters, all of Krefeld, Germany

[73] Assignee: Eduard Küsters, Krefeld, Germany

[21] Appl. No.: 667,546

[22] Filed: Mar. 17, 1976

[30] Foreign Application Priority Data

Mar. 18, 1975 Germany .............. 2511873

[51] Int. Cl.² .............................................. B29C 3/00
[52] U.S. Cl. ...................................... 425/406; 100/295
[58] Field of Search ............... 100/295; 425/149, 406, 425/335, 338

[56] References Cited

U.S. PATENT DOCUMENTS

| | | | |
|---|---|---|---|
| 2,394,941 | 2/1946 | Smith | 100/295 X |
| 2,561,169 | 7/1951 | Bickelhaupt, Jr. | 425/149 |
| 3,052,918 | 9/1962 | Holmes | 425/149 |
| 3,130,469 | 4/1964 | Helmrich | 425/149 |
| 3,191,524 | 6/1965 | Ludwig | 100/295 X |
| 3,386,374 | 6/1968 | Tezuka | 100/295 X |
| 3,570,060 | 3/1971 | Stephenson | 425/149 X |
| 3,881,852 | 5/1975 | Ahrwieler | 425/149 |
| 3,890,413 | 6/1975 | Peterson | 425/149 |
| 3,907,473 | 9/1975 | DeMets | 425/149 |

Primary Examiner—Robert L. Spicer, Jr.
Attorney, Agent, or Firm—Kenyon & Kenyon, Reilly, Carr & Chapin

[57] ABSTRACT

A press for exerting a pressure over an area in a longitudinal section of a sheet, particularly a press for producing wood chip board and similar materials, having two opposed pressure plates between which the sheet is passed, and which are braced against respective support structures provided on the outside, wherein the pressure is transmitted by a pressure medium to at least one pressure plate from the support structure associated with it through several pressure elements arranged at points lined up across the sheet in such a manner that a variable pressure profile across the sheet results.

9 Claims, 5 Drawing Figures

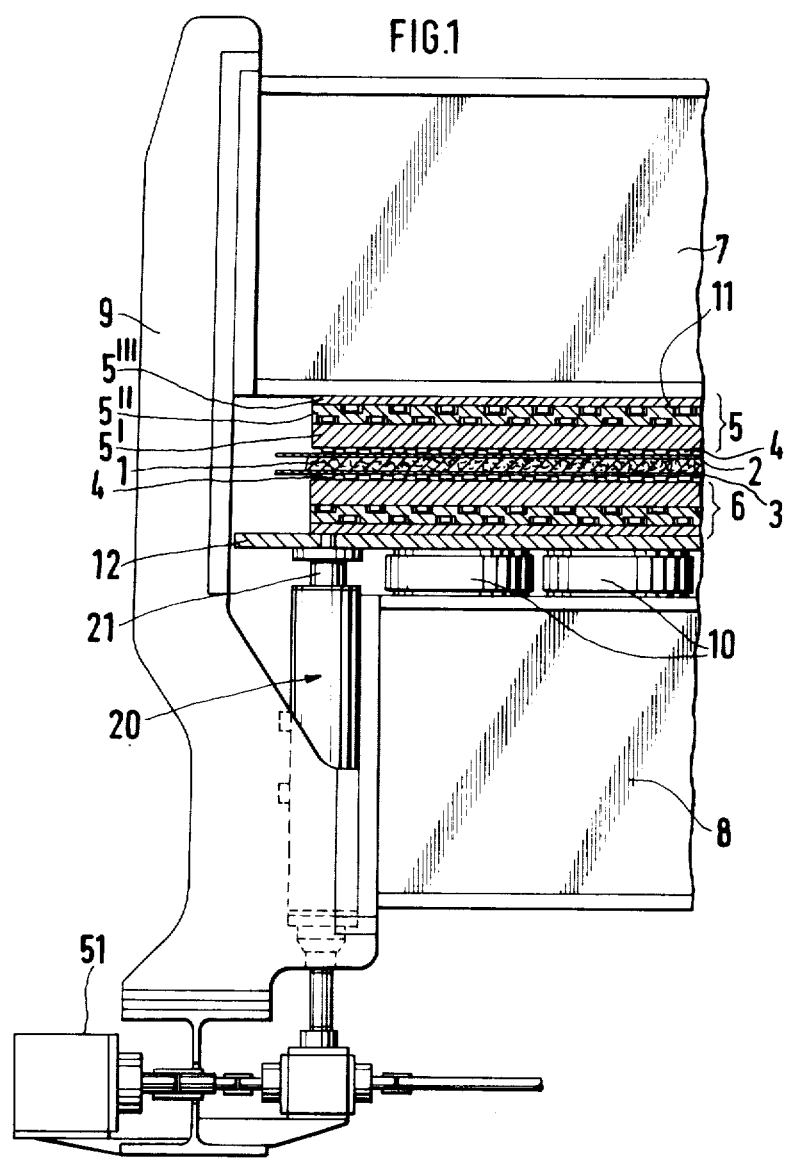

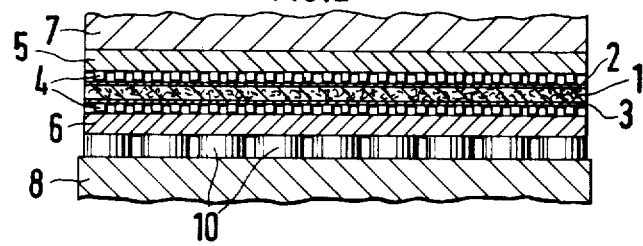
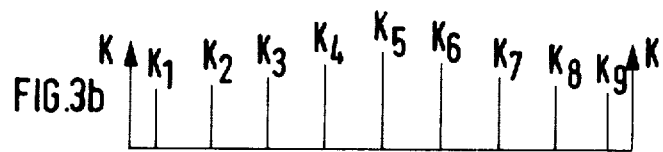
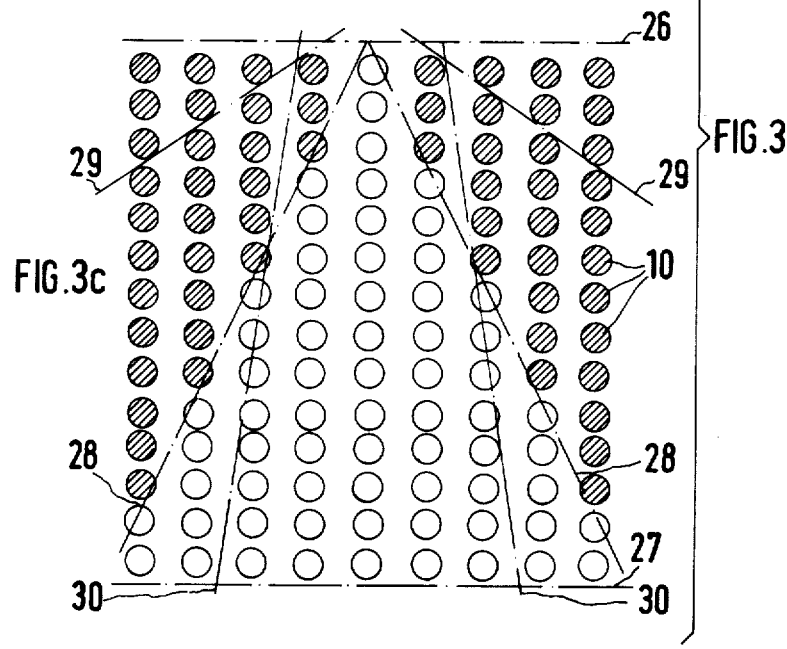

PRESS FOR EXERTING A PRESSURE OVER AN AREA

BACKGROUND OF THE INVENTION

This invention relates to presses for exerting a pressure over a longitudinal section of a sheet in general and more particularly to an improved press of this nature which permits obtaining a variable pressure profile across the sheet.

A press of this type having two opposed pressure plates and pressure elements is described in U.S. Pat. No. 3,881,852. Pressure elements are arranged alongside each other in rows transverse to the sheet form sets of such elements. In the travel direction of the sheet, a number of such sets corresponding to the length of the pressure section is also arranged one behind the other. The pressure elements belonging to a set extending across the sheet are connected with each other so that the same pressure prevails in them and a correspondingly uniform pressure is transmitted to the sheet through the pressure plate.

It can happen that uneven pressures will occur in the sheet transverse to the latter. In the manufacture of wood chip board this can come about through uneven pouring of the chip mixture making up the sheet. This chip mixture then presents a different resistance to the compression when it is compressed to the same height. While such nonuniformities can be corrected by appropriate, careful pouring, there is another phenomenon which leads to a pressure profile across the sheet which cannot be influenced from the outside. This is the steam pressure which occurs in the interior of the sheet during the manufacture of wood chip board. For various reasons, the chip mixture must be adjusted to a certain moisture content. One reason is that, when the bed of chips runs into the hot press, steam must form in a sudden burst and then flow immediately into the interior of the mass of chips to cause rapid heating therein. Without this steam burst, there would be an excessive deal in heating the interior of the sheet being formed since heat can be supplied only from the surfaces.

This steam formation, which in itself is desirable, produces a pressure profile across the sheet with a high pressure in the center of the sheet and lower pressure toward the edges. This pressure distribution comes about because the steam can easily escape laterally at the edges, while more toward the center it must travel longer distances through the labyrinth-like mass of chips. The discharge resistance for the steam becomes larger toward the center of the sheet so that, in the center, the pressure building up due to the formation of the steam is better retained.

The pressure, which is nonuniform transverse to the sheet, now acts, among other things, on that pressure plate which is supported on the rear side by the pressure elements. These pressure elements provide only a uniform counter pressure. The uniformities in the sheet therefore lead to a flexural stress of the pressure plate. Because the occurring forces are substantial, due to the large areas, the flexural stress taking place can lead in some cases to appreciable deflections which result in undesirable nonuniformity of the thickness of the sheet.

SUMMARY OF THE INVENTION

In view of the problems noted above, it is an object of the present invention to counteract the deflection of the pressure plate supported by the pressure elements if there is nonuniform pressure in the sheet.

To solve this problem, according to the present invention, the force exerted is controllably variable, at least in some pressure elements.

By appropriately adjusting the forces exerted by the individual pressure elements within a set extending across the sheet, it is possible to compensate the pressure profile produced by the sheet and to counteract the deflection of the pressure plate.

For control reasons, it is more practical if the force of the pressure elements situated toward the edge of the sheet is lowered, instead of increasing the force toward the center of the sheet.

The sets of pressure elements which follow each other in the direction of the sheet always receive, as can be seen from the aforementioned U.S. Pat. No. 3,881,852, a given pressure which is controlled by suitable control elements in such a manner that the thickness of the sheet is kept within accurately predetermined limits. The pressure is always available for the entire set of pressure elements which are lined up one behind the other across the sheet. This pressure is different, of course, for the sets of pressure elements which follow each other in the direction of the sheet and is highest at the beginning.

In a first embodiment of the present invention, the effective area of the pressure elements exerting the force is made variable.

The pressure available for a given set of pressure elements lined up across the sheet remains the same for all pressure elements of this set. However, the areas on which the pressure acts is changed in the one or more of these pressure elements, so that a different force results from the individual pressure elements and, thereby, it is possible to compensate the nonuniform pressure distribution caused by the sheet.

In the preferred embodiment, the pressure elements are designed as a piston/cylinder unit consisting of two cup-like parts which are assembled together with the open sides facing each other, the rims of the cups forming the pair of cylindrical surfaces, forming a seal. Such a construction is disclosed in detail in U.S. Pat. No. 3,881,852.

With such pressure elements, the change in the effective area can be realized by dividing off at least one annular chamber, the piston/cylinder unit, but using at least one additional pair of cylindrical surfaces arranged concentrically within the other pair of cylindrical surfaces with pressure medium admitted to this chamber separately from the rest of the piston/cylinder unit.

In this manner, the available pressure can be communicated to either the remainder of the interior or only to the annular chamber or to both. The pressure element then exerts forces corresponding to the respective areas. The steps of the force can be influenced by designing the dimensions of these areas accordingly. Even with only one additional pair of cylinder surfaces, three force steps are possible. With only two additional pairs of cylinder surfaces, an increase to seven force steps occurs. Through suitable arrangement of these variable pressure elements and suitable choice of the force steps, the deflection of the pressure plate can be counteracted in such a manner that the thickness deviations of the sheet formed remain within the tolerance limits.

Another manner for influencing the force of the pressure elements comprises connecting at least some pressure elements to a pressure ratio control device.

In such a case, the pressure elements themselves remain unchanged. However, a pressure which differs in the ratio of the desired forces difference is supplied to some of the pressure elements of a set extending across the sheet.

In the illustrated embodiment of this implementation, the central pressure elements receive the full pressure provided by the calibrated control for the respective set of pressure elements, while the pressure ratio control device provides a partial pressure to the pressure elements situated toward the edge of the sheet.

The force exerted by these pressure elements is therefore smaller, matching the smaller pressure in the sheet at its edge.

The pressure ratio control device can comprise, for example, a two arm lever which operates a partial pressure control valve by its tilting movement. The input pressure and the partial pressure generated by the partial pressure control valve act on the two ends of the lever which has its fulcrum adjustable along its length in order to change the lever arms and to thereby adjust the desired partial pressure.

At equilibrium, the partial pressure control valve is inactive. A change of the partial pressure results in a rotation of the lever which is communicated to the partial pressure control valve, so that the latter can cancel out the deviation of the partial pressure. By moving the fulcrum, one can determine at which pressure ratios or forces exerted on the ends of the lever equilibrium is to take place.

A pressure ratio control device operating in a similar manner for controlling the pressure of rolls is described in German Patent 1,460,632.

It is advisable that the pressure ratios adjusted by the pressure ratio control devices of at least some pressure elements be capable of being adjusted together so that simultaneous changing of the pressure ratios of a plurality of pressure elements can be obtained. This may be necessary for adapting to different conditions in the sheet and to its behavior.

In accordance with one important embodiment of the invention, within the overall arrangement of the pressure elements, the pressure elements assigned to the center of the sheet have a force which is not controllable and pressure elements assigned to the dge of the sheet have a force which is controllable. The border lines between the two kinds of pressure elements diverges from the beginning of the pressure section onward in fan-like fashion.

In this case, the central pressure elements receive the full pressure which is assigned to the respective set of pressure elements lined up across the sheet by the corresponding control device. This pressure therefore acts against the maximum pressure in the center of the sheet. At the beginning of the pressure action, where therefore the steam is generated with a sudden burst in the manufacture of wood chip board, the pressure difference between the center and the edge of the sheet is the largest and, accordingly, the largest compensation must be provided. It is therefore necessary to adapt the force exerted by the pressure elements located even at a relatively short distance from the center of the sheet. In the further course of the compression section the vapor pressure inside the sheet gradually becomes equalized so that the pressure profile becomes flatter and the necessary adaption need be made only a greater distance from the center of the sheet. Toward the end of the compression section, it may, for instance, be sufficient to make the force of only the outermost pressure elements controllable. However, whether the border line between the controlled and the uncontrolled pressure elements reaches the edge of the sheet at the same time as the end of the compression section, or before or after, depends on the nature of the sheet to be produced and the conditions to be met in the operation.

BRIEF DESCRIPTION OF THE DRAWINGS

FIG. 1 is a cross section through the edge zone of the press of the present invention.

FIG. 2 is a schematic cross section through the entire press.

FIG. 3 is a schematic plan view of the arrangement of the pressure elements in the compression section.

DETAILED DESCRIPTION OF THE PREFERRED EMBODIMENT

Figure 4:
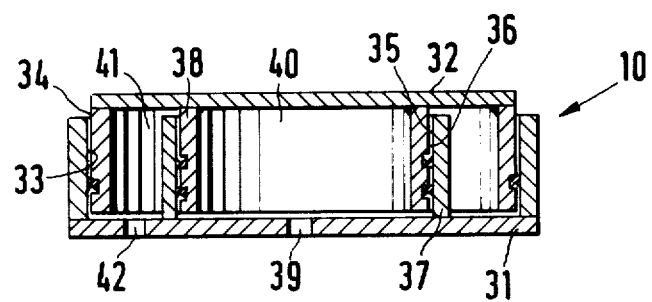
FIG. 4 is a cross section through an individual pressure element.

A sheet 1 of hardenable wood chip compound to be compressed is guided between forming belts 2 and 3 of strip steel about 1 to 1.5 mm thick. The sheet 1 and the forming belts 2 and 3 move in a direction out of the plane of the drawing in FIG. 1. The endless forming belts 2 and 3 revolve and are returned to the beginning of the compression section above and below the structure shown in FIG. 1.

The forming belts 2 and 3 are supported against pressure plates 5 and 6 by roller chains 4 which also advance with the belts. Both pressure plate 5 and pressure plate 6 include: a heatable plate 5′, through which heat and pressure are transmitted to the roller chains 4; a slotted return plate 5″; and a heat insulating intermediate plate 5′″. The roller chains 4 advance to the exit of the compression section, are there looped around the front edge of the pressure plates 5 and 6 and return, free of forces, in channels 11 in the interior of the pressure plates to the beginning of the compression section, where they are deflected from the channels 11 over the rear edge of the pressure plates 5 and 6 and then again run between the pressure plates 5 and 6 and the forming belts 2 and 3. The roller chains 4 are shown as small rectangles merely to simplify the drawing.

The pressure plates 5 and 6 are arranged between support structures which consist of heavy I beams 7 and 8 directly opposite each other transverse to the sheet 1. The beams 7 and 8 are connected with each other at their ends outside the sheet 1 and the forming belts 2 and 3 by a yoke 9 which is bolted or welded to the ends of the beams 7 and 8. A multiplicity of such pairs of beams 7 and 8, connected by yokes 9 on both sides, lie one behind the other in the travel direction of the sheet 1.

At the ends of the beam 8 control valves 20 are provided on both sides of the sheet. Their housings are connected to the beam 8 and act, through a pressure pad 21, upon an intermediate plate 12 disposed between the pressure plate 6 and the pressure elements 10. Plate 12 extends parallel to the sheet 1 over the entire width of the latter. In this manner, the pressure pads 21 are connected directly with the pressure plate 6 and transmit its movement directly into the control valve, which is arranged with its axis parallel to the direction of lift of the pressure cylinders 10 and to the direction of motion of the pressure plate 6. The control valve 20 acts to adjust the thickness of the sheet to a predetermined value by feeding to the pressure elements 10 more pressure fluid if a given sheet thickness is exceeded or draining pressure fluid from the pressure elements 10 when the sheet thickness falls below a given value.

To adjust the sheet thickness, the response point is set simultaneously at all control valves 20 by means of a control motor 51.

FIG. 2 shows the pressure plate 6 supported by sets of nine pressure elements 10 arranged one behind the other across the sheet. Upon compression, the sheet 1 exerts a counter pressure P which is composed of the mechanical counter pressure of the chip mixture and the superimposed pressure of the steam generated by the heating in the compression zone. A pressure distribution 25 which is not constant over the width of the sheet but has its maximum in the center of the sheet and drops off toward the edges of the sheet. This results since the steam can escape more easily in the outer regions.

If the pressure elements 10 were all connected with each other hydraulically and exerted in the same force, the pressure plate 6 would be deflected since the pressures according to curve 25, which are different over the width, act on the one side and the constant pressures of the pressure elements 10 act on the other side. The sheet 1 would thereby become thicker in the middle.

In order to prevent this, the force K exerted by the individual pressure elements is controllable in a variable manner.

In the illustration of FIG. 2, the forces $K_4$, $K_5$ and $K_6$ in the center are equal to each other, while toward the edges of the forces $K_3$, $K_2$ and $K_1$ and $K_7$, $K_8$ $K_9$ become increasingly smaller, so that the counterpressure P of the sheet 1, which is lower in the edge zones, faces correspondingly lower forces on the side of the pressure elements 10. The distribution of the forces $K_1$, $K_2$ . . . corresponds approximately to the distribution of the curve 25. In this manner, the pressure plate 6 is no longer subjected to a bending moment but remains essentially plane, so that the sheet thickness also remains constant over the width of the sheet.

In FIG. 3 the beginning 26 and the end 27 of the compression section are shown. In the sets of pressure elements 10 which are situated in the vicinity of the beginning 26 of the compression section and extend across the width, the curve 25 is still rather steep, as the steam has just formed at this point and there has yet been no time for pressure equalization. Pressure equalization does occur, however, in the further course of the compression section, which manifests itself in increasing flattening of the pressure curve 25. In the vicinity of the beginning 26 of the compression section, a reduction of the exerted force must take place even in the immediate vicinity of the center of the sheet in the pressure elements 10 located there. In order to obtain adequate matching to the pattern of the curve 25, it is sufficient at a points situated further toward the end 27 of the compression section to control only pressure elements 10 situated further out.

In FIG. 3, the field of the pressure elements 10 is shown. The pressure elements 10 which are not controlled and exert the full force are shown as circles and the pressure elements 10 which exert only part of the force as shaded. The border lines 28 between the inner region of the uninfluenced pressure elements and the outer region of the pressure elements 10, the force of which is variable, diverge in the travel direction 30 of the sheet 1 in a fan-like fashion. In the illustrated embodiment, the last two sets of pressure elements 10 extending across the sheet are no longer controlled, but exert a pressure which is uniform over the width of the sheet. The border line 28 thus reach the edge of the field of pressure elements before they reach the end 27 of the compression section. However, depending on the material and the operating procedure, the border lines may also be steeper, as is shown by lines 29, or less steep as is shown by lines 30. The diverging pattern of the border lines, however, remains in accordance with the increasing flattening out of the counter pressure cover 25.

In FIG. 4, a pressure element 10 in which the effective area of the pressure is variable is illustrated. The pressure element 10 consists of two cup shaped parts 31 and 32, the rims of which form a pair of cylindrical surfaces 33 and 34 acting as a seal. The parts 31 and 32 are placed into each other with their open sides facing each other.

In the interior of the elements 31 and 32 there is provided concentrically to the other pair of cylindrical surfaces 33 and 34 a further pair of cylindrical surfaces 35 and 36, which are formed by the tube sections 37 and 38 connected to the bottoms of the elements 31 and 32. These cylindrical surfaces 35 and 36 cooperate in a sealing manner.

In the element 31, a central inlet 39 is provided. Through inlet 39 the inner chamber 40 formed inside the pair of cylindrical surfaces 35 and 36 can be filled with the pressure medium. Into the annular chamber 41 located between the pairs of cylindrical surfaces 33 and 34 and 35 and 36 an inlet 42, through which this annular chamber can be filled with pressure medium, opens.

The forces generated by the pressure element 10 correspond, for constant pressure at the inlets 39 and 42, to the cross sectional areas of the chambers 40 and 41. Three force steps result, which correspond to the admission of pressure to the chambers 40, to the chamber 41 or to both chambers 40 and 41.

By providing further parts of cylindrical surfaces, still more force steps can be generated.

Figure 5:
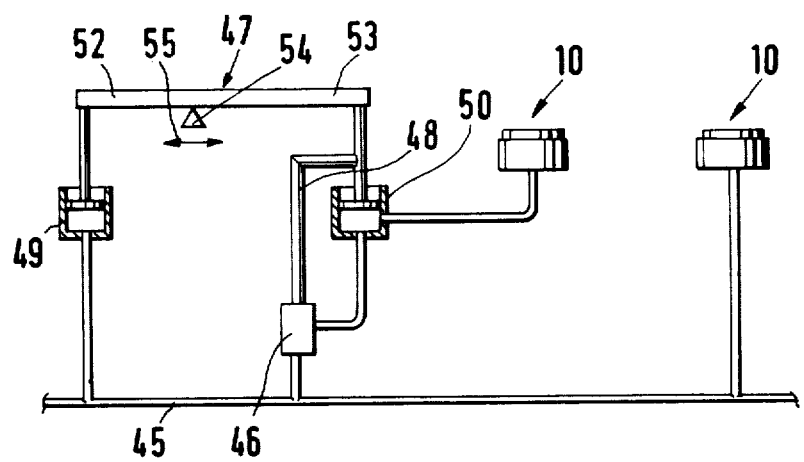
FIG. 5 is a schematic view of an arrangement with a pressure ratio control device.

In FIG. 5, an embodiment is shown, in which the magnitude rather than the effective area of the pressure is changed in certain pressure elements 10. The input pressure is brought in through a line 45 and acts, for instance, on the pressure elements 10 to the right in FIG. 5. The pressure element 10 to the left in FIG. 5, however, receives only a partial pressure, which is supplied by the partial pressure control valve 46. The partial pressure control valve 46 is actuated by a two arm lever 47 through a connecting link 48. On one end of the lever 47, the full input pressure acts in the cylinder 49. At the other end, the partial pressure control valve 46 acts in the cylinder 50. If this partial pressure deviates from the desired reference value, a movement of the piston in the cylinder 50 will result. This movement is communicated through the link 48 to the partial pressure control valve 46, which then restores the correct value of the partial pressure. The ratio of the partial pressure to the input pressure is determined by the lever arms 52 and 53 of the lever 47. The fulcrum 54 of the lever 47 can be moved as shown by the direction of the arrow 55. As a result, the force required by the cylinder 50 to reach equilibrium with respect to the force of the cylinder 49, which is connected to the input pressure, and, thereby, the partial pressure can be controlled. It is advantageous that the fulcrums 54 for all pressure elements whose force is to be adjusted be moved together.

We claim:

1. In a press for exerting a pressure over an area in a longitudinal section of a sheet, particularly a press for producing wood chip board and similar materials, having two opposed pressure plates which are braced against respective support structures provided outside the pressing area between said plates and in which the pressure is transmitted from at least one support structure to at least one associated pressure plate by supplying a pressure medium to several pressure elements disposed in lines across the sheet, the improvement comprising means associated with at least some of the pressure elements for permitting said pressure elements to exert to a force which is controllably variable.

2. Apparatus according to claim 1 wherein said means comprise means to permit varying the force applied by said pressure elements to a value lower than the pressure elements which do not have said means associated therewith and wherein said means are associated with pressure elements in at least one line, which elements are situated toward the edge of the sheet.

3. Apparatus according to claim 1 wherein a pressure medium at a constant pressure is applied to all pressure elements across a line and wherein said means associated with at least some of said pressure elements comprise means to cause said pressure medium to be applied to a selectable, variable area of said pressure elements thereby permitting the total force exerted by said pressure elements to be controlled through control of the area to which said pressure medium is applied.

4. Apparatus according to claim 3 wherein said pressure elements comprise piston/cylinder units including two cup-like parts disposed inside each other with open sides facing each other, the rims of said cups forming a cooperating pair of cylindrical surfaces and wherein said means for controlling the area to which said pressure medium is applied comprises at least one additional pair of cylindrical surfaces arranged within said pair of cylindrical surfaces forming an annular chamber and an interior chamber and means for separately admitting said pressure medium to said annular chamber and to said interior chamber.

5. Apparatus according to claim 1 wherein said means associated with said pressure elements comprises a pressure ratio control device obtaining an input from said pressure medium and providing an output to its associated pressure element which is related to the pressure of said pressure medium in a predetermined ratio.

6. Apparatus according to claim 4 wherein pressure ratio control devices are coupled to the pressure elements situated toward the edge of the sheet to provide a partial pressure thereto.

7. Apparatus according to claim 6 wherein said pressure ratio control devices comprise: a two-arm lever; a partial pressure control valve actuated by the tilting of said lever; means for coupling the input pressure to one end of said lever; means for coupling the partial pressure generated by the partial pressure control valve to the other end of said lever; and means for adjusting the fulcrum of said lever to thereby adjust the desired partial pressure.

8. Apparatus according to claim 7 and further including means which permit the pressure ratios adjusted by the pressure ratio control devices of at least some pressure elements to be changed together.

9. Apparatus according to claim 1 wherein the pressure elements associated with the center of the sheet are not controllable, the pressure elements associated with the edge of the sheet are controllable and where the border lines between the two kinds of pressure elements diverge in the travel direction of the sheet in a fan-like fashion, from the beginning of the compression section onward.

* * * * *